(12) United States Patent
Voelker

(10) Patent No.: US 7,048,245 B1
(45) Date of Patent: May 23, 2006

(54) COMPUTER COPY HOLDER

(76) Inventor: Sunshine Voelker, 1230 Park Ave. West, No. 229, Highland Park, IL (US) 60035

( * ) Notice: Subject to any disclaimer, the term of this patent is extended or adjusted under 35 U.S.C. 154(b) by 0 days.

(21) Appl. No.: 10/623,923

(22) Filed: Jul. 21, 2003

(51) Int. Cl.
*A47B 97/04* (2006.01)

(52) U.S. Cl. .................... 248/448; 248/309.1; 400/718

(58) Field of Classification Search ............ 248/309.1, 248/441.1, 442.2, 447, 447.1, 447.2, 448, 248/451, 452, 453, 459, 918; 400/718
See application file for complete search history.

(56) References Cited

U.S. PATENT DOCUMENTS

| | | | | |
|---|---|---|---|---|
| 1,037,233 A | * | 9/1912 | Furrow | 248/448 |
| 2,242,737 A | * | 5/1941 | Alfreds | 24/67.11 |
| 3,748,767 A | * | 7/1973 | Giesecke | 40/491 |
| 4,187,630 A | * | 2/1980 | Giulie et al. | 40/790 |
| 4,312,490 A | * | 1/1982 | Biasini | 248/542 |
| 4,372,518 A | * | 2/1983 | Biasini | 248/441.1 |
| 4,588,190 A | * | 5/1986 | Stewart et al. | 473/435 |
| 4,619,429 A | * | 10/1986 | Mazza | 248/447.2 |
| 4,632,471 A | * | 12/1986 | Visnapuu | 312/233 |
| 4,869,565 A | * | 9/1989 | Bachman | 312/234 |
| 5,082,235 A | * | 1/1992 | Crowther et al. | 248/231.41 |
| 5,104,088 A | | 4/1992 | Bakanowsky | 248/442.2 |
| 5,383,642 A | * | 1/1995 | Strassberg | 248/442.2 |
| 5,505,421 A | | 4/1996 | Marthaler | 248/442.2 |
| 5,533,702 A | | 7/1996 | Koch | 248/442.2 |
| 5,549,268 A | | 8/1996 | Hopwood | 248/442.2 |
| 5,620,162 A | | 4/1997 | Beckwith et al. | 248/442.2 |
| 5,697,594 A | | 12/1997 | Adams et al. | 248/442.2 |
| 5,725,191 A | | 3/1998 | Nemeth | 248/442.2 |
| D396,248 S | | 7/1998 | Nemeth | D19/88 |
| 5,786,861 A | * | 7/1998 | Parker | 248/442.2 |
| 5,987,794 A | * | 11/1999 | Lavi et al. | 40/611.04 |
| 5,988,582 A | * | 11/1999 | Olivo | 248/442.2 |
| 6,286,800 B1 | | 9/2001 | Junius et al. | 248/442.2 |
| 6,290,200 B1 | * | 9/2001 | Ko | 248/442.2 |
| 6,293,511 B1 | * | 9/2001 | Shepherd | 248/441.1 |

FOREIGN PATENT DOCUMENTS

DE 19802503 A1 * 7/1999

* cited by examiner

*Primary Examiner*—Anita M. King
(74) *Attorney, Agent, or Firm*—Davidson Berquist Jackson & Gowdey, LLP

(57) ABSTRACT

A copy holder for use with a portable notebook computer is provided, having rectangular, relatively stiff sheet elements slidably disposed between upper and lower parallel channels affixed to the back of a computer screen. Hollow tubular members of square cross section are fixed at the top and bottom edges of the support sheets to slide laterally within the upper and lower channels. In one embodiment, multiple sheet elements may be arranged to telescope from the back of the notebook computer screen to adjust the size of the copy holder. Two copy holders may be slidably stored on the back of the notebook computer screen so that either or both may be extended laterally to support copy on either or both sides of the screen. The copy holder includes a support member that can be used to support the copy holder as a stand-alone copy holder.

13 Claims, 7 Drawing Sheets

COMPUTER COPY HOLDER

BACKGROUND OF THE INVENTION

This invention relates generally to copy holders, that is, devices to hold printed or handwritten copy for display by the user of a computer keyboard. More particularly, this invention relates to a copy holder for use with a portable notebook computer.

BACKGROUND OF THE INVENTION

In the field of computers, notebook computers have become very popular. Notebook computers are used by people while traveling as well as in office or home environments. Notebook computers may be used in cramped quarters such as on airplanes and commuter trains. Typical copy stands used in an office environment for holding copy for viewing while typing on a computer keyboard are inappropriate for use on a notebook computer, especially in cramped quarters where there may be no room for an external copy stand.

Several copy holders have been suggested by the prior art for use on a notebook computers. An important consideration, however, for attachment of a copy holder to a notebook computer is that a notebook computers display is a liquid crystal display screen, which may be easily damaged by the attachment of clamps or other clipping devices, as shown in some of the prior art. Additionally, the prior art notebook computer copy holders are not suitable for supporting relatively heavy copy, such as note pads and booklets.

The devices shown in the prior art also do not provide support for more than one piece of copy material, for example when a user desires to enter data from two different hard copy sources.

It is, therefore, an object of this invention to provide a means for holding copy for a notebook computer.

Another object of the present invention is to provide such a device which can be attached to a notebook computer screen without damaging the screen.

Another object of the present invention is to provide such a device which can be mounted on the back of a notebook computer screen without adding significant thickness dimension to the combined package.

It is still a further object of the invention to provide such a device which can support copy on either or both sides of a notebook computer screen.

It is yet another object of the present invention to provide such a device which can support relatively heavy copy materials.

It is a further object of the present invention to provide a copyholder for use with a portable notebook computer which copyholder may be detached from said computer to stand alone.

A still further object of the present invention is to provide a notebook computer copyholder which may be articulated to provide privacy screens.

Yet another object of the present invention is to provide a notebook computer copyholder with means for securing the copy to the copyholder.

SUMMARY OF THE INVENTION

The above objects of the invention, and others, are met by a notebook computer copy holder produced from rectangular, relatively stiff sheet elements slidably disposed between upper and lower parallel channels affixed to the back of a computer screen. Hollow tubular members of square cross section are fixed at the top and bottom edges of the support sheets to slide laterally within the upper and lower channels. It should be recognized that the hollow tubular members may be of any suitable cross sectional shape, and are not intended to be limited to a square cross section.

The device is flat and rectangular in shape when in storage mode and attaches to the back of a laptop or desktop computer. This device is not thick enough to prevent the computer from fitting in its carry case. The device may be attached to service the left or right or both sides of the computer. It extends out to one or both sides of the monitor screen and supports various media so that referencing the media while using the computer is easy and comfortable. The device may be fabricated from strong but lightweight plastic or metal.

In the preferred embodiment, multiple sheets may be stacked to telescope laterally from the back of the notebook computer screen to adjust the size of the lateral copy holder. Also, two copy holders may be slidably stored on the back of the notebook computer screen so that either or both may be extended laterally to support copy on either or both sides of the screen.

When extended away from the body of the screen, the lateral copy holder sections can be hinged so that they can be individually folded toward the user for ease of viewing or privacy.

An L-shaped support member is provided, with its horizontal leg stored within the bottom square tube of each side of the copy holder. The vertical leg of the support member is rotatably attached to the edge of the copy holder. When the support member is removed from the square tubing and adjusted for position, it can be used to support the copy holder under relatively heavy loads, resting on the horizontal leg of the support. This support member can also be used to support the copy holder of the present invention when it is released from the aforementioned channels.

BRIEF DESCRIPTION OF THE DRAWINGS

These and other objects and advantages are attained by the means described herein and disclosed in the accompanying drawings.

DETAILED DESCRIPTION OF THE PREFERRED EMBODIMENT

A notebook computer copy holder incorporating the various features of the present invention is illustrated generally at 10 in the figures.

The copy holder embodying the present invention is comprised primarily of flat panels slidably mounted in upper and lower parallel guide channels which are attached to the upper and lower areas, respectively, of the back of a notebook computer screen.

The notebook computer copy holder is designed for being removably secured to the screen 12 of a notebook computer for holding documents 14 for viewing while using the computer. Moreover, in the preferred embodiment the copy holder 10 is designed to be usable with a notebook computer on either or both sides of the screen 12. Further, the copy holder 10 is designed such that documents 14 retained thereby are not damaged while being retained.

The back of a notebook computer screen 12 serves as the notebook computer lid when closed and is generally fabricated of plastic or metal such as aluminum or titanium, which is less apt to be damaged by contact with foreign items such as adhesive or clamps than the display screen itself. For this reason, the present invention is designed to be attached to a notebook computer at the back of the display so as not to damage any of the pixels of the display screen.

Figure 2:
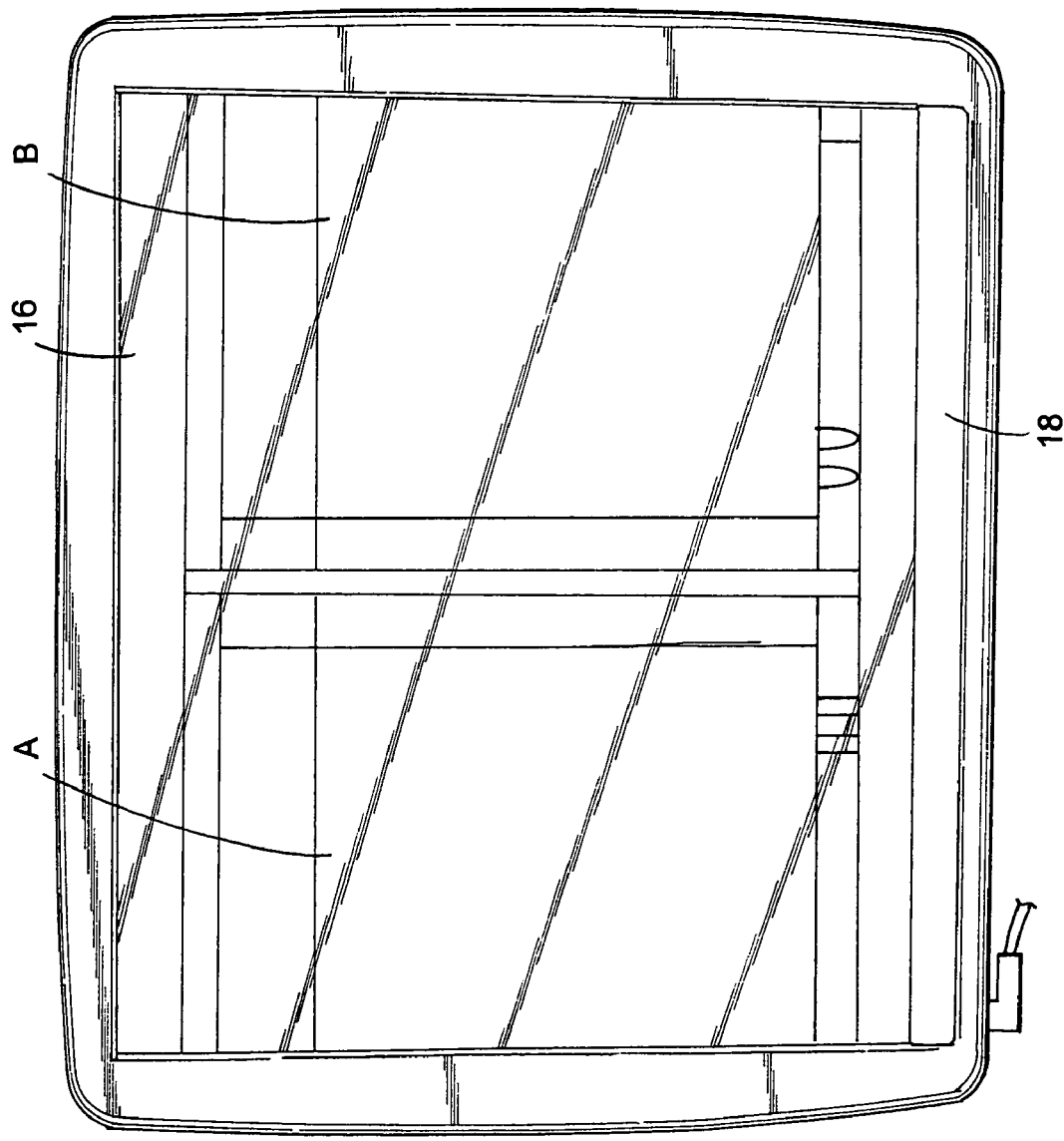
FIG. 2 is a rear elevation view of the copy holder of the present invention as affixed to a notebook computer and fully retracted.
Figure 3:
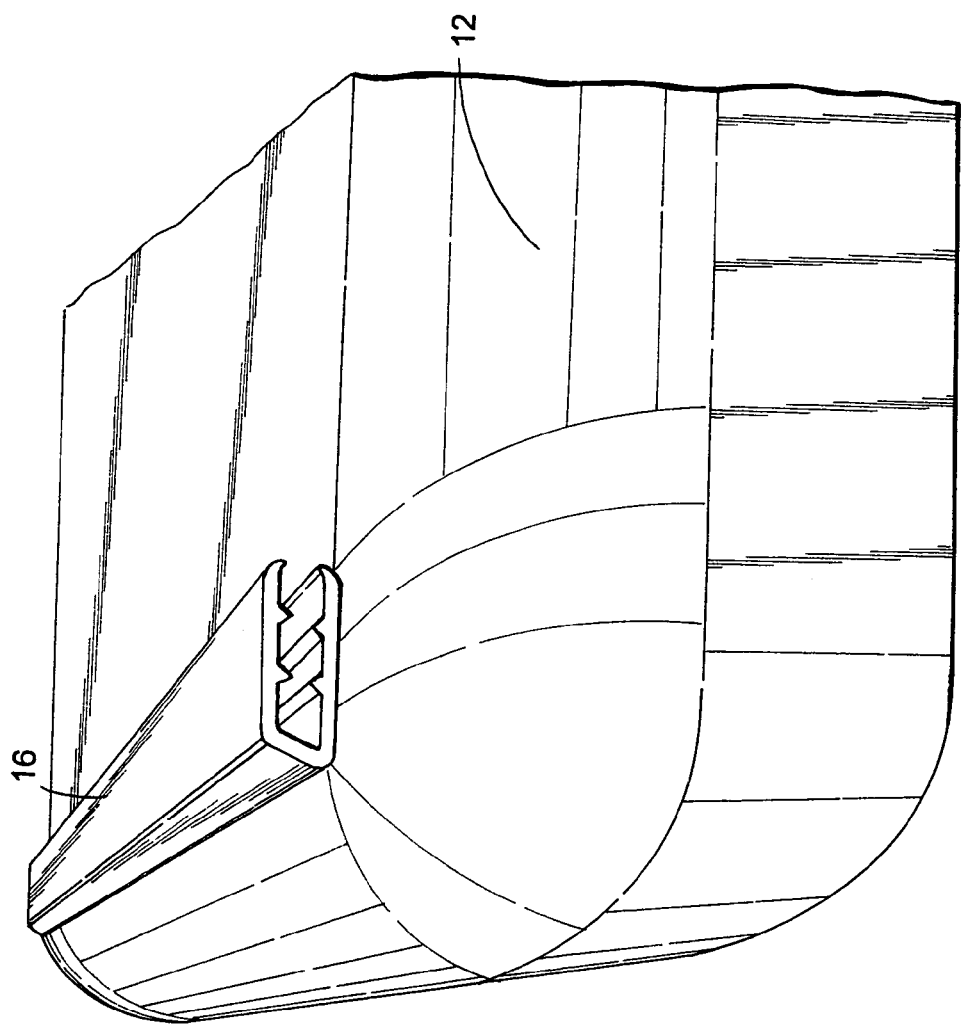
FIG. 3 is a perspective view of a detail of the copy holder of the present invention showing one of the channels affixed to the notebook computer.

As shown in FIG. 2, upper channel guide 16 is horizontally affixed to the top of the back of the computer screen. This affixation can be effected by any suitable permanent or semi-permanent adhesive. It is anticipated that these channels can be attached by double-sided adhesive tape or by various hook-and-loop attachment tapes such as VELCRO®.

Lower channel guide 18 is similarly affixed at the bottom of the back of the notebook computer screen. Upper channel guide 16 is essentially a downward facing U-channel. Lower channel guide 18 is essentially an upper facing U-channel and is parallel to upper guide channel 16. This arrangement provide parallel tracks for the components of the copy holder of the present invention.

In the preferred embodiment, two substantially identical sections A and B of copy holder 10 are slidably mounted in channel guides 16 and 18. Each of the channel guides is somewhat flexible and biased inwardly to pinch panels A and B to somewhat retard their lateral movement.

Figure 4:
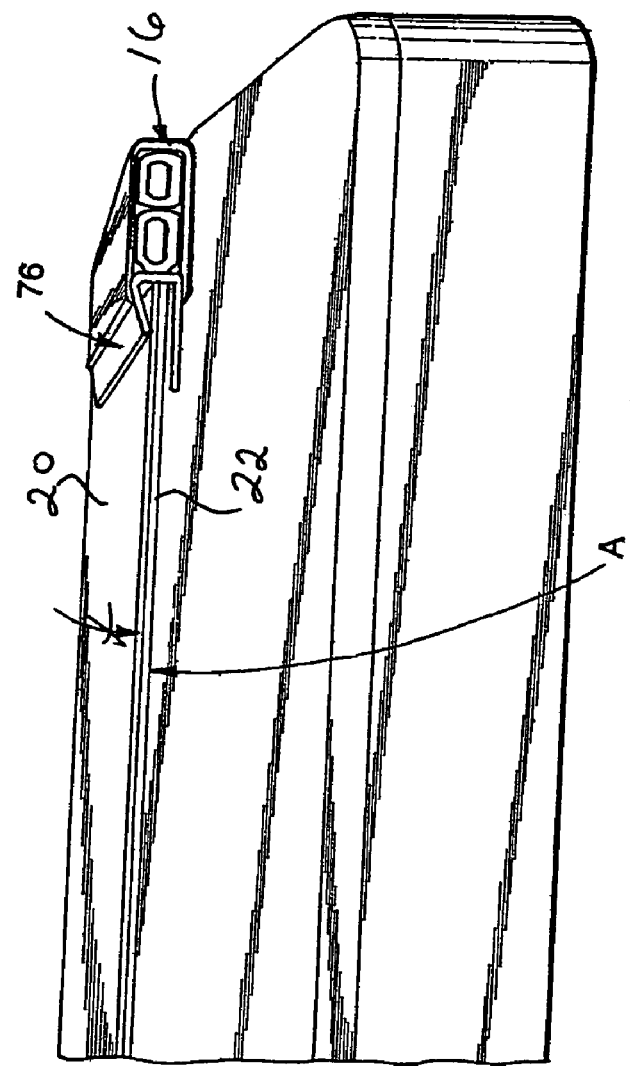
FIG. 4 is an end elevation view of the notebook computer copy holder of FIG. 1 shown being carried on the screen of a notebook computer.
Figure 4:
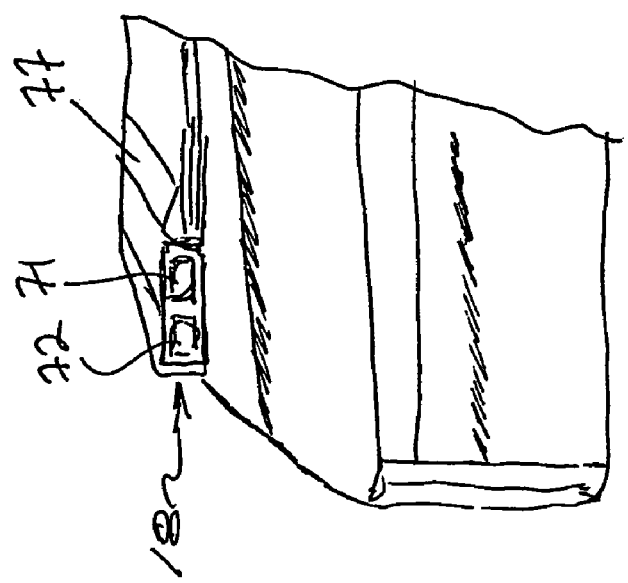
Figure 5:
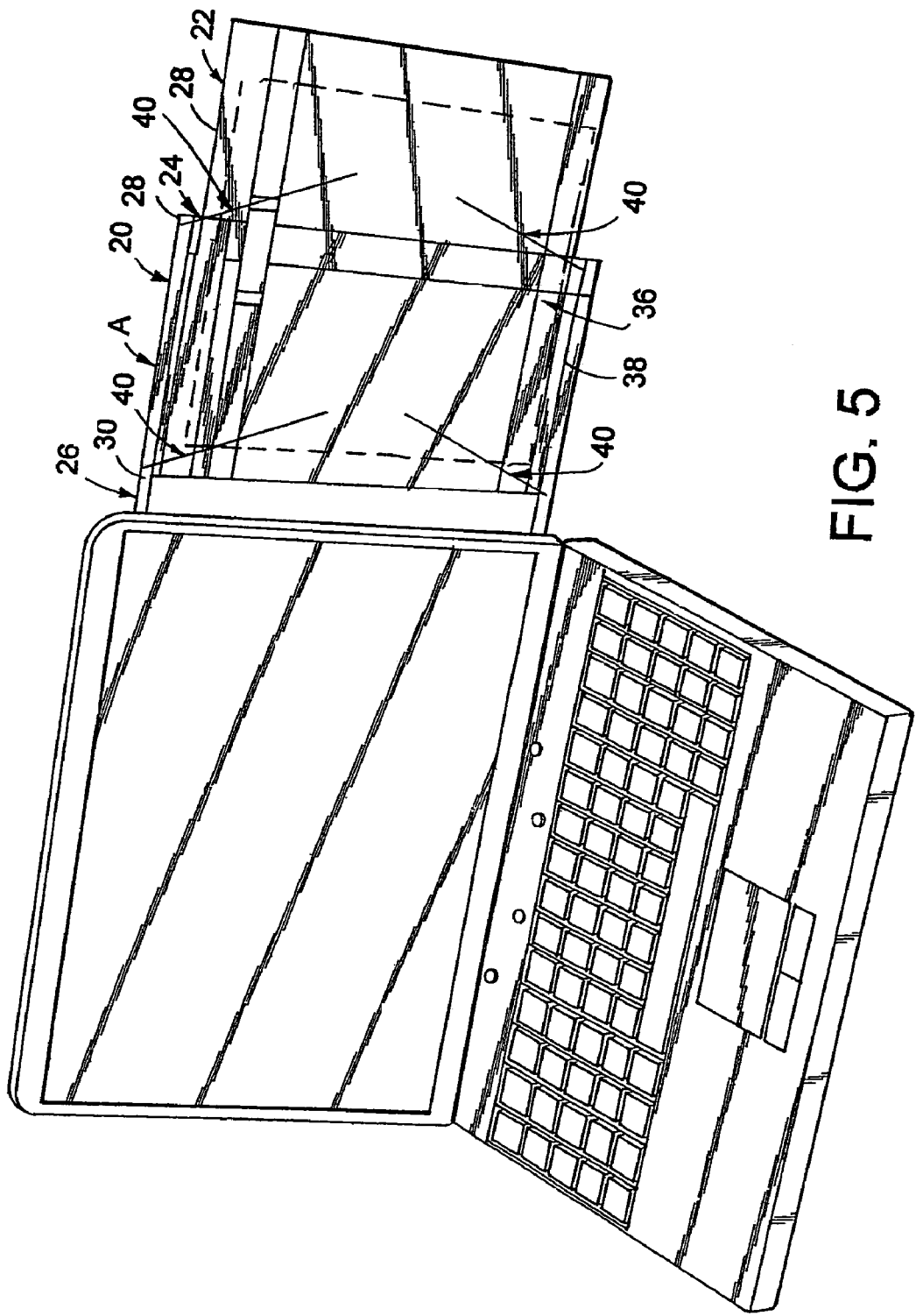
FIG. 5 is a general perspective view of the notebook computer copy holder of FIG. 1, with the copy holder shown fully extended.
Figure 6:
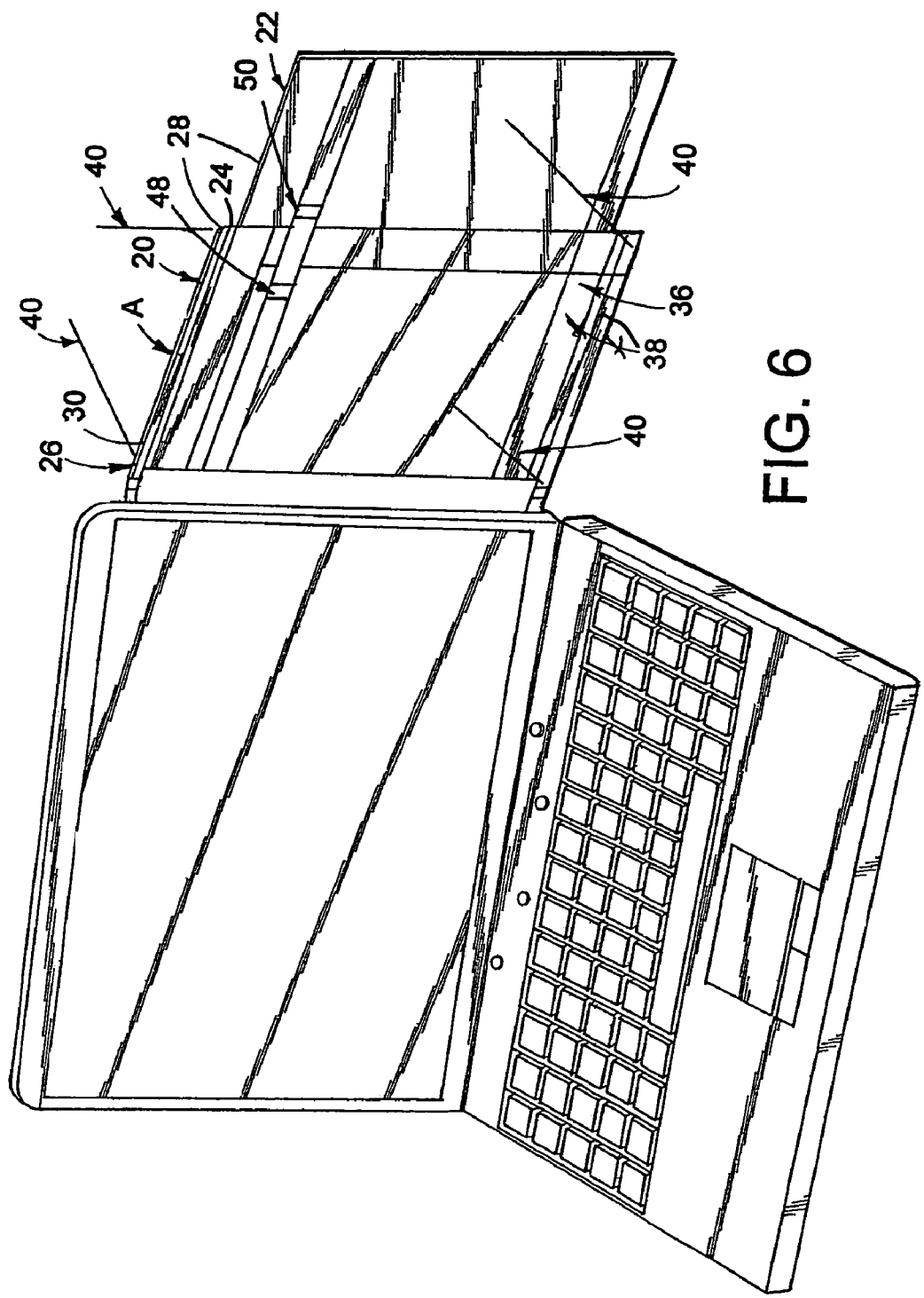
FIG. 6 is a general perspective view of the notebook computer copy holder of FIG. 1, with the copy holder shown extended and hinged forward.
Figure 7:
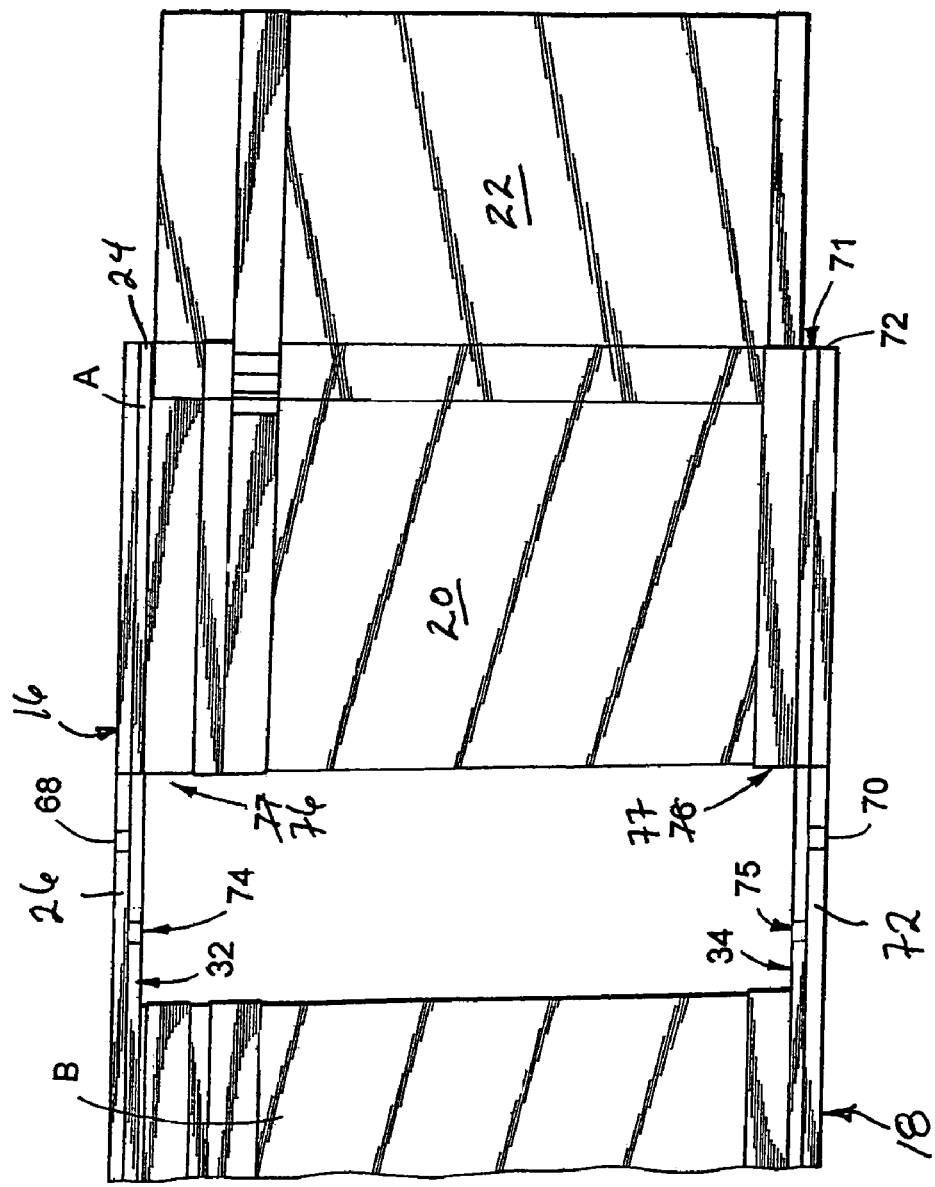
FIG. 7 is a view of the copy holder removed from the computer to show its construction in greater detail.

Panel A is shown in FIGS. 4 and 5 in greater detail. Panel A includes primary sheet 20 and subordinate sheet 22. Primary sheet 20 includes square cross-section tube 24 fixed to the top edge of primary sheet 20 and square cross-section tubes 71 affixed to the bottom of primary sheet 20. These tubes extend the width of primary sheet 20. Second upper tube 26 is of substantially identical hollow tube cross-section, and is affixed and stacked on top of the first tube. Second lower tube 72 is of a substantially hollow tube cross-section and is affixed to and stacked below tube 71. Tubes 26 and 72 extend along the top and bottom edges, respectively, of panel A from the outer top corner 28 past the inner top corner 30, extending the length approximately double the width of primary sheet 20.

Subordinate sheet 22 is slidably mounted in channels 76 and 77 attached below tube 24 and above tube 71. Horizontal ledge flap 36 is provided at the bottom of primary sheet 20. This ledge flap holds the bottom edge of sheets of copy mounted on Panel A of 10 (shown in phantom in FIG. 5). This ledge flap has horizontal interior ridges 38 in order to slightly adjust the distance that the media sits away from the holder and change its angle to reduce glare. A similar and cooperating ledge flap is affixed to the bottom edge of subordinate sheet 22.

Stiff wire retainers 40 are pivotally attached at each corner of panel A. These wires are designed to be used to retain sheets of paper on the copyholder.

Near the top of primary sheet 20 is horizontal retaining band 42. Retaining band 42 is comprised of two elements 44 and 46 which are slidably connected by sliding clasps 48 and 50. Band 42 provides the function of retaining copy, especially the backing boards of writing pads. Also, the clasps 48 and 50 limit the travel of the bands, and therefore, the separation of primary and secondary plates as they are telescoped apart.

Section B is essentially identical in construction to Section A of copy holder 10, being a mirror image thereof. The difference between the construction of Section A and Section B is that Section B has one square upper support tube and one square lower support tube. Each of these support tubes extends from the left upper edge and left lower edge, respectively of Section B, extending past the right edge of Section B so that the total length of each tube is approximately double the width of Section B. Upper and lower tubes 32 and 34 on Section B are of square cross-section, and of smaller dimension than the square structural tubes on Section A. Upper tube 32 on Section B is aligned with second upper tube 24 on Section A, similarly lower tube 34 on Section B is aligned with upper tube 71 on Section A. Tube 32 and tube 34 are dimensioned to slide into tubes 24 and 71, respectively.

Figure 1:
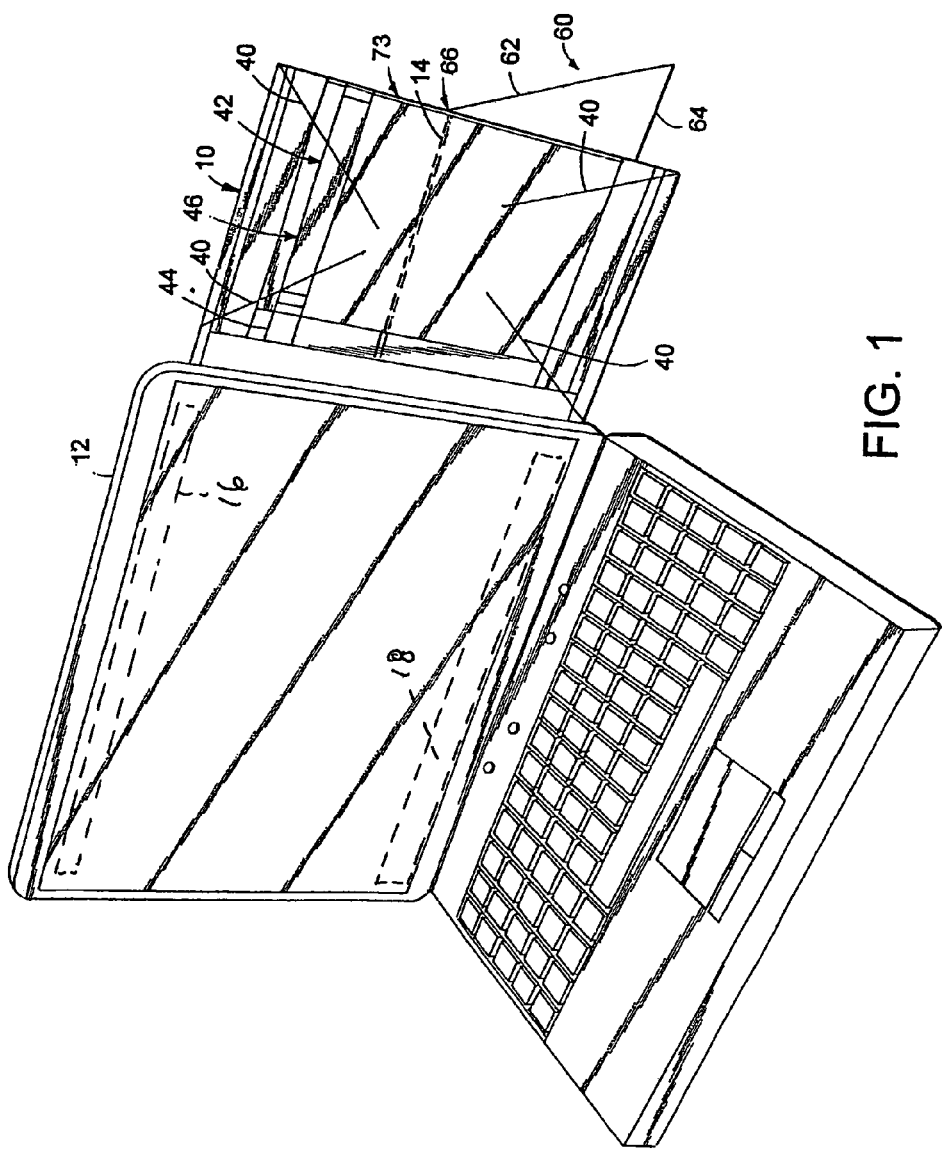
FIG. 1 is a general perspective view of the notebook computer copy holder constructed in accordance with the present invention and affixed to a notebook computer.

Auxiliary support 60 is L-shaped, including vertical leg 62 and horizontal leg 64. Horizontal leg 64 is stored in the lower tube. Vertical leg 62 is engaged by removable support yoke 66, which is pivotally and slidably mounted to outer vertical edge 73 of section A. In use, auxiliary support 60 is removed from the lower tube and support yoke 66, then re-attached to support yoke 66 and adjusted by sliding vertical leg 62 in support yoke 66 and adjusting the angle of support yoke 66 relative to the plane of section A. In this manner, auxiliary support 60 may be used to support Section A as shown in FIG. 1. This support is useful if the copy is of significant weight. Additionally, the copyholder of the present invention may be removed from the notebook computer by completely sliding rails away from the computer. The copyholder can stand on its own by using auxiliary support 60.

The copyholder panel may be used substantially parallel to the alignment of the computer screen. 12 or they may be articulated towards the user for comfortable viewing or to function as "blinders" to provide screen privacy, for example, in an airliner. Hinges 68 and 70 are located on tubes 26 and 72. Hinges 68 and 70 are exposed operational when the panels are extended past the edge of the screen. Hinges 74 and 75 function in the same way for Panel B. Suitable hinge assemblies are provided to enable the entire assembly to pivot about the vertical line between the two hinges so that the assembly may be folded forward. The hinges provided are provided with tight tolerances to enable the apparatus to be semi-rigidly set at various positions.

From the foregoing description, it will be recognized by those skilled in the art that a notebook computer copy holder offering advantages over the prior art has been provided. Specifically, the notebook computer copy holder provides a means for holding a document or group of documents in relation to a notebook computer screen for viewing while typing. The copy holder of the present invention may be closed and stored while attached to the back of the compute screen or removed after use such that the notebook computer is not damaged. The copy holder provides a means whereby copy may be held with respect to either side or both sides of the notebook computer screen.

While a preferred embodiment has been shown and described, it will be understood that it is not intended to limit the disclosure, but rather it is intended to cover all modifications and alternate methods falling within the spirit and the scope of the invention as defined in the appended claims.

What is claimed is:

1. In combination a copy holder and a notebook computer, the copy holder providing a way to display to a user of the notebook computer, the notebook computer having an outercase, the combination comprising:
   an upper horizontal channel affixed to the outercase,
   a lower horizontal channel affixed to the outercase, parallel to said upper horizontal channel,
   a first panel slidably disposed between said upper and lower channels for movement between a stored position lying against and within the boundary of said outercase and a use position outboard of said outercase where said first panel can retain and display copy materials to the computer user.

2. The combination as in claim 1 wherein said first panel has parallel top and bottom edges which cooperate slidably with said upper and lower channels, respectively.

3. The combination as in claim 2, further including rigid linear tubular members affixed to said top and bottom edges.

4. The combination as in claim 3, wherein said tubular members have rectangular cross-sections.

5. The combination as in claim 1, further comprising a second panel nested on and slidably cooperative with said first panel, whereby said second panel may be telescoped apart from said first panel to expand the width of said copy holder.

6. The combination as in claim 2, further comprising means associated with said first panel for retaining sheets of copy material thereon.

7. The combination as in claim 6, wherein said retaining means includes a flap affixed adjacent to the bottom edge of said first panel.

8. The combination as in claim 7, wherein said flap includes interior horizontal ridges.

9. The combination as in claim 6, wherein said retaining means comprises a plurality of stiff wire members, each having a first end and a second end, with said first end rotatably affixed to said panel adjacent a corner of said panel and said second end adapted to grip sheets of copy material thereon.

10. The combination as in claim 6, wherein said retaining means may be rotated to a substantially vertical position to extend the support surface of the copy holder.

11. The combination as in claim 3, wherein said tubular members include hinges to allow said panel to rotate about a vertical axis whereby said copy holder may be rotated toward a computer user.

12. The combination as in claim 1, wherein the copy holder is affixed to the exterior of a lid of the notebook computer.

13. In combination, a copy holder and a notebook computer, the copy holder attached to an outer surface of a lid of the notebook computer, the combination comprising;
   a pair of spaced apart slide supports affixed to the outer surface of the computer lid;
   at least one panel secured to and between upper and lower support members, said upper and lower support members being slidably retained by said pair of spaced apart slide supports so that the upper and lower supports can be moved relative to said lid to permit said at least one panel to be moved between a nested position within the confines of said lid and a use position extended outwardly beyond a side edge of the lid to permit copy material to be held on said at least one panel for viewing.

* * * * *